United States Patent [19]

Lorence et al.

[11] Patent Number: 4,794,668

[45] Date of Patent: Jan. 3, 1989

[54] ASSIST STRAP TERMINATION STRUCTURE

[75] Inventors: Brian S. Lorence, Warren; Richard A. Phelps, Ferndale, both of Mich.

[73] Assignee: Chivas Products Limited, Sterling Heights, Mich.

[21] Appl. No.: 65,485

[22] Filed: Jun. 23, 1987

[51] Int. Cl.$^4$ ............................................. A47B 95/02
[52] U.S. Cl. ................... 16/125; 16/114 R; 16/110 R; 296/71
[58] Field of Search ............... 16/110 R, 125, 114 R, 16/116 R, DIG. 24, DIG. 25, DIG. 28; 190/115–117; 296/71

[56] References Cited

U.S. PATENT DOCUMENTS

| | | |
|---|---|---|
| 1,027,726 | 5/1912 | Hanson ............................. 16/114 R |
| 1,425,534 | 8/1922 | Mosher ............................. 16/114 R |
| 3,183,549 | 5/1965 | Hammestahr . |
| 3,977,054 | 8/1976 | Moore et al. . |
| 4,067,602 | 1/1978 | Ahlisch et al. . |
| 4,356,592 | 11/1982 | Moore . |

FOREIGN PATENT DOCUMENTS 1176012 8/1964 Fed. Rep. of Germany .
828420 2/1960 United Kingdom .

Primary Examiner—Nicholas P. Godici
Assistant Examiner—Carmine Cuda
Attorney, Agent, or Firm—Townsend and Townsend

[57] ABSTRACT

A termination structure for an assist strap includes a rectangular, ring-like mounting bracket used to secure an end of the assist strap and a generally U-shaped assist strap termination piece to a vehicle. The termination piece, which has first and second legs, and assist strap extend from opposite open ends of the bracket. The first leg, the end of the assist strap and the base of the bracket are fastened to each other and to the vehicle by a screw. The distal end of the second leg is positioned within the bracket so that the assist strap appears to have a loop at its end. The second leg has an L-shaped first fastener element secured to its interior surface which engages the upstanding head of the screw, which serves as a second fastener element. The fastener elements are positioned and sized so that the distal end of second leg, which is resilient, is compressed within the bracket to keep the fastener elements engaged to prevent removal of the distal end of the second leg.

12 Claims, 2 Drawing Sheets

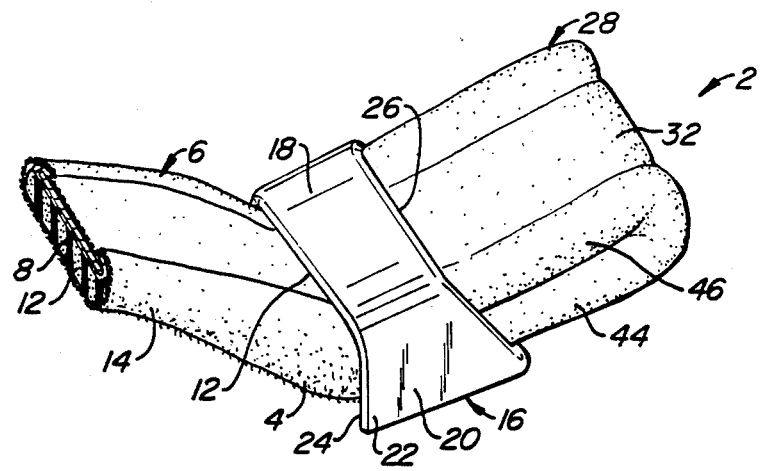
FIG._1.
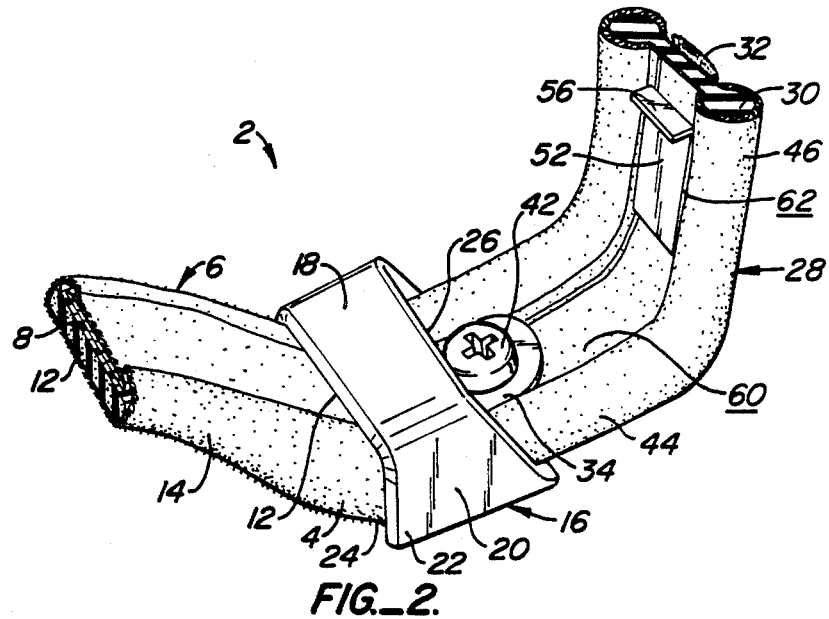
FIG._2.
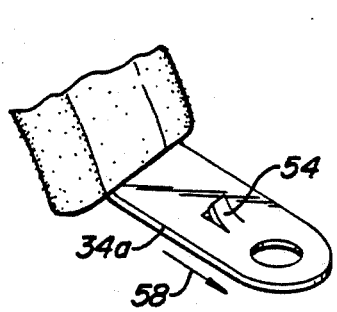
FIG._4.
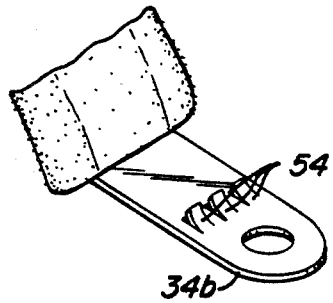
FIG._5.

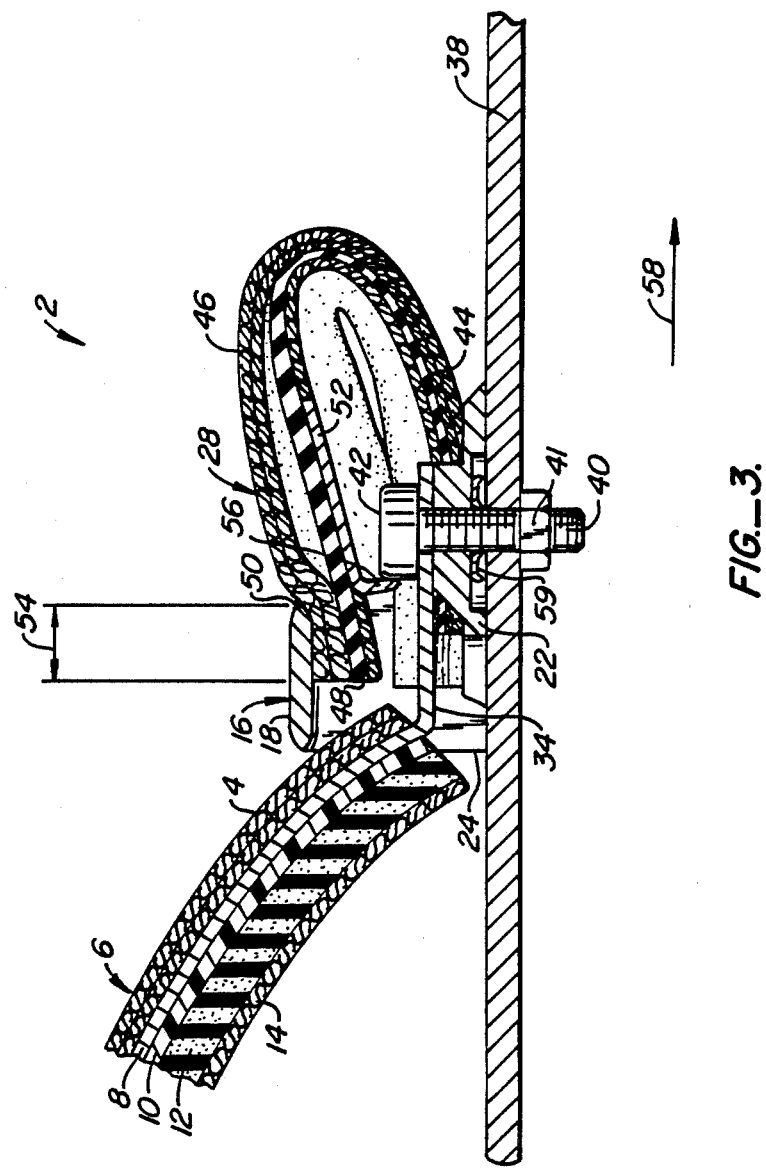
FIG._3.

ASSIST STRAP TERMINATION STRUCTURE

BACKGROUND OF THE INVENTION

Assist straps are often used in automobiles for various purposes. When used on an inside door panel, an assist strap provides a convenient and secure handle for closing the vehicle door. Assist straps can also be used elsewhere, such as mounted above the door frame or on the back of a front seat to aid passengers entering and exiting the vehicle.

Assist straps are typically constructed of a somewhat flexible metal structural strip against which a foam padding is placed. The structural strip and padding are then encased within a decorative covering, often textured vinyl or velvet. See U.S. Pat. No. 4,356,592 for an example of an assist strap structure. The end of the structural strip is used to secure the assist strap to the door panel or other structural member of the vehicle. Although quite functional, the end of the assist strap must be covered or otherwise concealed to provide a pleasing appearance.

In the past the ends of the assist straps have often been covered by various types of snap-on or other removable covers. See U.S. Pat. Nos. 4,356,592 and 4,067,602. Another type of assist strap termination structure has also been used in which the end of the structural strip of the assist strap is secured to a bracket, the bracket carrying one part of a snap element. The other part of the snap element is secured to a strap termination piece made to mimic the look of the assist strap. This type of arrangement requries the use of the special snaps which raises the cost of the termination structure.

SUMMARY OF THE INVENTION

The present invention is directed to an assist strap termination structure used to secure the ends of the assist strap to a vehicle, typically to an inside panel of an automobile. The structure includes a U-shaped strap termination piece secured to a bracket at each end of the assist strap. One leg of the termination piece is secured directly to the bracket while the other leg is folded back over, inserted into the bracket and secured in position by a simple, cost-effective fastening element.

The bracket has a top, sides and a bottom with first and second open ends opposite one another. The bracket is used to secure the end of the assist strap and the strap termination piece to one another and to the vehicle. The termination piece has an outward appearance similar to that of the assist strap and extends from the first open end of the bracket. The first leg of the strap termination piece is fastened to the bracket and extends from the second open end of the bracket. The distal end of the second leg of the strap terminal piece is positioned within the bracket and adjacent the interior surface of the bracket so that the termination structure provides an appearance of an assist strap having a loop at its end.

The second leg of the termination piece has a first fastener element secured to its interior surface, preferably in the form of an L-shaped element with the shorter leg of the L extending normally away from the interior surface of the second leg. The shorter leg engages a second fastener element secured to the bracket. Preferably the second fastener element is provided by the upstanding head of a screw, rivet, or similar fastener used to secure the end of the assist strap, the first leg of the termination piece and the bracket to one another and to the vehicle. The fastener elements are positioned and sized so that insertion of the distal end of the second leg of the strap terminal piece within the bracket causes the strap terminal piece, which is resilient, to compress somewhat. When the first and second fastener elements engage one another, they are held in engagement by the resilient biasing action resulting from the partial compression of the second leg.

One advantage of the invention is that it eliminates the relatively costly snaps associated with a prior art strap termination structure while providing a pleasing loop type of strap termination. The second fastener element is, in the preferred embodiment, provided by a fastener used to secure the end of the assist strap, the first leg of the termination piece and the bracket to one another and to the vehicle. The first fastener element can be a simple L-shaped member, typically steel, which engages the second fastener element after the distal end of the second leg is pushed into the bracket. Thus, no special or additional fasteners need to be used.

If desired, the second fastener element could also be made as an integral part of the bracket or as an integral part of the end of the structural strip of the assist strap. For example, the assist strap could have flexible tabs punched or otherwise formed at their ends. Using flexible tabs as the second fastener elements would have the advantage that they could be made to be deflected away from the first fastener element during insertion of the distal end of the second leg. After the first fastener element passes the flexible tab, the flexible tab would reassume its normal position to prevent the removal of the second leg by its engagement with the first fastener element.

Another advantage of the invention is that the resilient material from which the strap terminal piece is made provides the biasing to keep the first and second fastening elements engaged. If necessary the fastener elements can be disengaged, so that the second leg of the strap terminal piece can be removed from the bracket, using proper tools and techniques while otherwise substantially preventing such removal of the second leg.

Other features and advantages of the invention will appear from the following description in which the preferred embodiments have been set forth in detail in conjunction with the accompanying drawings.

BRIEF DESCRIPTION OF THE DRAWINGS

FIG. 1 is a perspective view showing an assist strap termination structure made according to the invention and used with an assist strap, only the end of the assist strap being shown.

FIG. 2 is a perspective view of the termination structure of FIG. 1 prior to the insertion of the second leg of the strap termination piece into the bracket.

FIG. 3 is a cross-sectional view of the structure of FIG. 1 shown mounted to a panel.

FIG. 4 shows an alternative embodiment of the structural strip terminal of FIG. 3 incorporating a flexible tab acting as the second fastener element.

FIG. 5 shows an alternative embodiment to FIG. 4 including three staggered flexible tabs.

DETAILED DESCRIPTION OF THE PREFERRED EMBODIMENT

Turning now to FIG. 1, an assist strap termination structure 2 is shown mounted to the end 4 of an assist strap 6. Assist strap 6 is the type having a structural strip 8, typically spring steel, partially encased within a plastic wrap 10. A foam layer 12 is situated beneath the strip 8 and wrap 10, the combination being encased within a covering 14, such as textured vinyl.

Structure 2 includes a generally rectangular, ring-like bracket 16 having a top 18, sides 20 and a bottom 22. Bracket 16 defines first and second open ends 24, 26 from which assist strap 6 and a strap termination piece 28 extend. Strap termination piece 28, which is U-shaped as shown in FIGS. 2 and 3, includes a first leg 44 and a second leg 46 and has a resilient core 30, made of vinyl or other rubber-like material, encased within a covering 32. Covering 32 is of the same material as covering 14; core 30 and covering 32 are configured to mimic the appearance of assist strap 6.

As seen in FIG. 3, terminal 34 of structural strip 8 is secured to bottom 22 of bracket 16 and to first leg 44 by a screw 40 and a push nut 41. Screw 40, which has an enlarged head 42, passes through appropriately positioned holes in terminal 34, first leg 44, bottom 22 and a base or panel 38. A nut 43 is fastened to screw 40 to secure structure 2 to panel 38. Second leg 46, which is folded back over first leg 44, has its distal end 48 inserted past top edge 50 of top 18 to underlie top 18. As shown in FIG. 1, this arrangement provides a smooth, attractive termination for the end 4 of assist strap 6.

Second leg 46 is secured in place by the engagement of an L-shaped first fastener element 52 with the enlarged head 42 of screw 40; enlarged head 42 acts as a second fastener element. As indicated in FIG. 3, distal end 48 of second leg 46 is compressed somewhat within bracket 16. This biases fastener element 52 into engagement with enlarged head 42 to keep second leg 46 from being removed from bracket 16. By appropriately sizing the chosen distance 54 between top edge 50 and enlarged head 42, the engagement of the first and second fastener elements 52, 42 is maintained by the resilient biasing of terminal piece 28. Fastener elements 52, 42 can be disengaged by the appropriate manipulation of terminal piece 28, typically by inserting a flat tool between the fastener elements, so to expose screw 40 when needed.

In the embodiment of FIGS. 1-3, enlarged head 42 acts as the second fastener element 42 thus substantially reducing the cost of termination structure 2. If desired, the second fastener element could be provided in other ways. For example, and referring to FIG. 4, a resilient tab 54 can be formed in a terminal 34a of the assist strap. First fastener element 52 would deflect flexible tab 54 upon the insertion of distal end 48 into bracket 16. After the downwardly extending portion 56 of first fastener element 52 has passed tab 54, tab 54 would spring back up to block the passage of portion 56 in the direction of arrow 58 to prevent removal of the second leg. If desired, tab 54 need not be flexible; even if not deflectable by portion 56, it would still provide a ramped entry surface to aid insertion of distal end 48 into bracket 16. As shown in FIG. 5, a number of flexible tabs 54 could be formed at staggered positions in a terminal 34b to ensure a tight fit to compensate for normal manufacturing tolerances.

To assemble, terminal 34 and first leg 44 are preliminarily secured to bracket 16 by screw 40 and push-on nut 41 (see FIG. 3). The combination of bracket 16, terminal piece 28 and end 4 of assist strap 6 are mounted to panel 38 using screw 40 and nut 43. Once in place, distal end 48 is inserted through second open end 26 until portion 56 of first fastener element 52 passes second fastener element 42. The compression of second leg 46 at distal end 48 biases portion 56 towards bottom 22 thus maintaining the engagement of first and second fastener elements 52, 42. To remove distal end 48 of second leg from bracket 16, a tool can be inserted between the interior surfaces 60, 62 of first and second legs 44, 46 to bias first fastener element 52 away from second fastener element 42. However, terminal structure 2 is preferably configured so that distal end 48 of second leg 46 cannot be removed from bracket 16 by simply pulling on second leg 46.

Modification and variation can be made to the disclosed embodiments without departing from the subject of the invention as defined in the following claims. For example, separate fasteners could be used instead of fastener 40. Also, second fastener element 42 need not necessarily be positioned outside of bracket 16 as indicated by distance 54 in FIG. 3, especially if it is intended to permanently prevent the removal of distal end 48 of second leg 46 from within bracket 16.

We claim:

1. An improved termination structure of the type for use with an assist strap having ends, each end secured to a bracket for securing the bracket and the assist strap end therewith to a base, the bracket having a bottom and a top with a first open end, from which the assist strap extends, and a second open end, an edge of the top bounding a portion of the second open end, the improvement comprising:
   a generally U-shaped termination piece having first and second legs, the first leg secured to the bracket with the distal end of the second leg positioned within the bracket, the first and second legs having opposed interior surfaces, the termination piece extending in a first direction away from the assist strap;
   a first fastening element secured to the second leg; and
   a second fastening element secured to the bracket and positioned to engage the first fastening element at a chosen position to maintain the distal end of the second leg in position within the bracket.

2. The structure of claim 1 wherein the first fastening element is secured to the interior surface of the second leg.

3. The structure of claim 1 wherein the chosen position is a chosen distance from the edge of the top as measured along second direction lying parallel to the first direction.

4. The structure of claim 1 wherein the distal end of the second leg is positioned adjacent an underside of the bracket top.

5. The structure of claim 1 wherein the distal end of the second leg of the termination piece is resilient and the distal end of the second leg resiliently engages the bracket to bias the first fastening element into engagement with the second fastening element.

6. The structure of claim 1 wherein the termination piece has a resilient rubber core.

7. The structure of claim 1 wherein the first fastener element includes a portion extending away from the second leg.

8. The structure of claim 7 wherein the first fastener element is L-shaped.

9. The structure of claim 7 wherein:
the termination piece first leg is secured to the bracket by a fastener having a head positioned between the interior surfaces of the first and second legs; and
the head constitutes the second fastener element.

10. The structure of claim 9 wherein the termination piece is resilient and is sized so to bias the first and second fastening elements into engagement with one another.

11. An improved termination structure of the type for use with an assist strap having ends, each end secured to a bracket for securing the bracket and the assist strap end therewith to a base, the bracket having a bottom and a top with a first open end, from which the assist strap extends, and a second open end, an edge of the top bounding a portion of the second open end, the improvement comprising:
a generally U-shaped, resilient termination piece having first and second legs, the first and second legs having opposed interior surfaces, the first leg secured to the bracket by a fastener having a head positioned between the opposed interior surfaces, the distal end of the second leg positioned within the bracket to compressively engage an underside of the bracket top, the termination piece extending in a first direction away from the assist strap and generally parallel to the base of the bracket;
a first fastening element secured to the interior surface of the second leg; and
the head constituting a second fastening element, the head positioned to engage the first fastening element at a chosen position, the resilient termination piece biasing the first and second fastening elements into engagement with one another so to maintain the second leg in position adjacent the underside of the bracket.

12. A termination structure for securing the end of an assist strap to a base, the assist strap of the type including a structural member and a covering over the structural member, the termination structure comprising:
a bracket mountable to the base and having a top, a bottom and first and second open ends opposite one another, the second open end partially bounded by a top edge of the bracket top;
a generally U-shaped strap termination piece including first and second legs with opposed interior surfaces, the second leg having a distal end, the distal end being resilient;
means for securing the assist strap end and the strap termination piece first leg to the bracket so the assist strap extends from the first open end and the strap termination piece extends from the second open end;
a first fastener element secured to the interior surface of the second leg of the strap termination piece, a portion of the first fastener element extending away from the second leg interior surface, the portion of the first fastener element being positioned a first distance from the distal end of the second leg; and
a second fastener element secured to the bracket at a chosen position and engageable by the first fastener element, the chosen position and the first distance chosen so positioning the distal end of the second leg within the bracket to compressively engage the bracket top with the portion of the first fastening element engaging the second fastener element, resiliently biases the first and second fastener elements into engagement with one another so to hinder removal of the distal end from the bracket.

* * * * *